Nov. 6, 1956  A. FLOCKE  2,769,346
DRIVE CHAIN
Filed Nov. 16, 1953

INVENTOR.
Alexander Flocke
BY
Patent Agent.

United States Patent Office 2,769,346
Patented Nov. 6, 1956

2,769,346

DRIVE CHAIN

Alexander Flocke, Solingen, Germany

Application November 16, 1953, Serial No. 392,431

Claims priority, application Germany November 17, 1952

2 Claims. (Cl. 74—250)

The present invention relates to chains and more particularly, to chains for chain drives. The conventional chains used for this purpose show the disadvantage of elongating in the long run, which causes increased wear on the one hand and much noise of operation on the other.

It is one of the objects of the invention to overcome these disadvantages. According to the invention a chain with its resilient single links is so formed as to exert uniform pressure in the direction of the axis of the elements engaged or driven by the chain. This construction, even after long use, prevents wear and fatigue of the chain, which is due to the fact that the resilient chain links firmly embrace the teeth of the driving or driven element, the chain sliding smoothly into the clearing between the teeth. Even at high speed, a chain of the nature described runs rather noiselessly.

The links of a chain according to the invention are constructed in the form of resilient arches bent outwardly and having enlarged ends with bores therethrough so as to form eyes for fastening parts or connecting members such as rivets or the like to be passed therethrough, the adjacent eyes of the arch-shaped chain links being embraced by a sleeve segment. On either side of the said segment may be provided a safety cap connected to the segment by means of the connecting member passing through the eyes of the arch-shaped links.

Due to the fact that the chain links are arch-shaped in such a manner that the tip of the teeth are at all times spaced from or cleared by the arch of the chain links, the chain links make it possible that their eyes be fitted into the clearing between the teeth in such a manner that uniform pressure will be exerted by the chain upon the sprocket wheel at any time without undesired stresses. Furthermore, such a chain insures a large surface of rolling contact between the sprocket wheel and the chain, as well as uniform pressure by all the chain links upon the sprocket wheel.

Further objects and advantages of the present invention will appear more clearly from the following specification in connection with the accompanying drawing in which.

Figure 1:
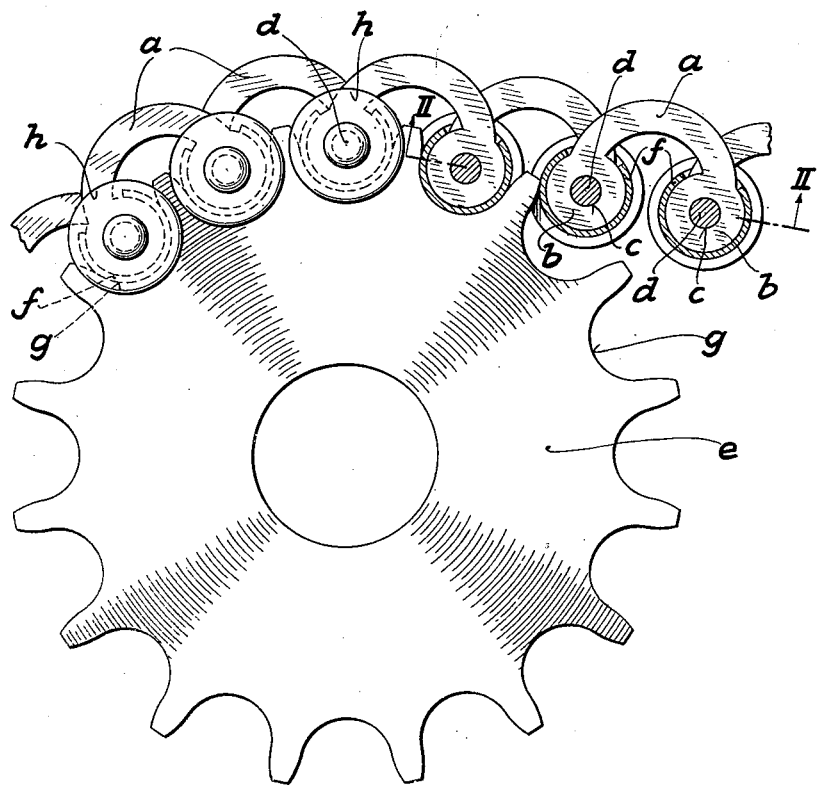
Fig. 1 is partly a side elevation and partly a cross section taken along the line I—I of Fig. 2 of a sprocket wheel with a chain according to the invention.
Figure 2:
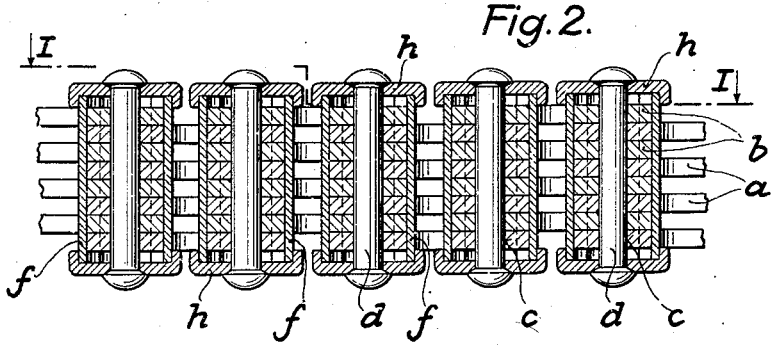
Fig. 2 is a cross section taken along the line II—II of Fig. 1.

The chain is composed of resilient arch-shaped links $a$ with enlarged ends $b$ each of which forming an eye. The links $a$ are placed side by side, one chain link extending in one longitudinal direction and the laterally adjacent link extending in the opposite longitudinal direction of the chain. At their enlarged ends or eyes, the arch-shaped links are provided with bores $c$ while rivets $d$ or the like respectively extend through those eyes of the links which are aligned in a direction transverse to the longitudinal direction of the chain. Those portions of the transversely aligned eyes $b$ of the chain links which face the sprocket wheel $e$ are embraced by a roller or sleeve segment $f$ engaging the complementary clearings $g$ or tooth spaces of the teeth of the sprocket wheel $e$.

At either end of the links forming the chain there are disposed safety caps $h$ the diameter of which is larger than that of the sleeve segment $f$. This ensures a satisfactory lateral guide of the chain on the sprocket wheel $e$, said caps likewise being fastened by means of the rivets $d$.

What I claim is:

1. A drive chain for operative engagement with a sprocket wheel, which comprises in combination: a plurality of arch-shaped chain links, each of said chain links having enlarged end portions with a bore therethrough so as to form a front eye and a rear eye, a plurality of connecting members respectively extending alternately through a front eye and a rear eye of said links for hingedly interconnecting the same, segmental sleeves respectively embracing the alternate front and rear eyes hingedly interconnected by the respective connecting member, said segmental sleeves being designed for engagement with the bottom portion of the tooth spaces of said sprocket wheel, and cap means arranged at each end of said sleeves and interconnected by said connecting members, the arch of each arch-shaped chain link being curved so as to be spaced at all times from the respective tip of the sprocket wheel tooth whose adjacent tooth spaces are engaged by the segmental sleeve embracing the eyes interconnected by the respective arch.

2. A drive chain according to claim 1, in which said cap means are arranged laterally to engage the sprocket wheel for guiding the chain thereon.

References Cited in the file of this patent

UNITED STATES PATENTS

| 327,446 | Knowlton | Sept. 29, 1885 |
| 1,720,852 | Nichols | July 16, 1929 |

FOREIGN PATENTS

| 26,947 | Great Britain | 1897 |
| 663,122 | Great Britain | Dec. 1951 |